United States Patent [19]

Hampel et al.

[11] 4,316,177

[45] Feb. 16, 1982

[54] DATA CLASSIFIER

[75] Inventors: Daniel Hampel, Westfield; Kalman J. Prost, East Windsor, both of N.J.

[73] Assignee: RCA Corporation, New York, N.Y.

[21] Appl. No.: 99,323

[22] Filed: Dec. 3, 1979

[51] Int. Cl.³ .......................... G06F 7/34; G05B 7/03
[52] U.S. Cl. ...................... 340/146.2; 340/146.3 WD
[58] Field of Search ..................... 364/728; 340/146.2, 340/146.3 Q, 146.3 WD

[56] References Cited

U.S. PATENT DOCUMENTS

| | | | |
|---|---|---|---|
| 2,885,655 | 5/1959 | Smoliar . | |
| 3,217,293 | 11/1965 | Metz | 340/146.2 |
| 3,237,159 | 2/1966 | Emmons | 340/146.2 |
| 3,251,035 | 5/1966 | Weinstein | 340/146.2 |
| 3,290,647 | 12/1966 | Joseph et al. | 340/146.2 |
| 3,478,314 | 11/1969 | Wedmore | 340/146.2 |
| 3,479,644 | 11/1969 | Spaid | 340/146.2 |
| 3,760,355 | 9/1973 | Bruckert | 340/146.2 |
| 3,796,868 | 3/1974 | Kaul et al. | 340/146.2 X |
| 4,031,511 | 6/1977 | Britton | 340/146.2 |
| 4,032,885 | 6/1977 | Roth | 364/728 |
| 4,053,871 | 10/1977 | Vidalin et al. | 340/146.2 |
| 4,110,737 | 8/1978 | Fahey | 340/146.2 X |
| 4,119,946 | 10/1978 | Taylor | 340/146.2 X |
| 4,164,728 | 8/1979 | Marsh | 340/146.3 Q |
| 4,168,529 | 9/1979 | Tomlinson | 364/728 |
| 4,205,302 | 5/1980 | Godo | 340/146.2 |

*Primary Examiner*—Felix D. Gruber
*Attorney, Agent, or Firm*—Samuel Cohen; Robert L. Troike; Donald W. Phillion

[57] ABSTRACT

A classifying system for determining with which group of a plurality of groups of reference file words a data word most closely compares and comprising a plurality of groups of comparison means each constructed to simultaneously and individually compare a different group of file words with said data word to produce a comparison pulse for each comparison of said data word with a file word. Means are provided for identifying each group of file words in which the comparison of not more than one file word with the data word produces a comparison pulse whose amplitude exceeds, in a given direction of polarity, the predetermined amplitude of a threshold signal, and further for identifying each of said one file words.

11 Claims, 6 Drawing Figures

DATA CLASSIFIER

This invention related generally to digitized data word classifying and more particularly to an improved classifier in which a data word is simultaneously compared with many groups of reference file words to determine with which group of file words the data word most closely compares.

For many purposes, it is necessary to classify data into one of several classes. For example, data received from an electrocardiogram can have characteristics indicating any one of many existing or incipient defects of the heart. When compared with data taken from the same heart at a previous time, such data can show, for example, changes in rhythm of various heat functions, changes in amplitudes of various frequency components of the signals produced by the heart, and other heart characteristics. By comparing the various signals derived from the electrocardiogram with various groups of reference file words, in which each group represents a different heart condition, and then determining to which group the data derived from the patient's heart belongs, the type of defect or disease of the heart can be determined.

As another example, in military usage a tank will generate various types of data signals as it rumbles over the ground including ground vibrations, certain types of noises generated by the mechanism of the tank itself, and perhaps reflected radar signals. The combination of all or most of these data signals is unique to and indicates the presence of a moving tank. Such data signals can be compared with the various groups of file words, in which each group contains file words corresponding to the different signals produced by tanks, planes, submarines, ships, or other equipments. The signals generated by the moving tank, for example, can be compared with all of the groups of file words, and it can thereby be determined to which group the signals (data words) generated by the tank belong, thus identifying the source of the received data words as being a tank.

There are, in the prior art, several ways of comparing a received data word with a group of file words to determine which of the file words the data words most closely compares. The data words and file words are sometimes referred to as vectors with the degree of comparison therebetween being referred to as the spacing between the vectors. In this specification, the terms "data words" and "file words" will be employed rather than the term "vector".

In the prior art structures, as each data word is received it is compared successively with all of the file words in the group of file words with the degree of comparison, as measured by a comparison signal, between the data word and the first file word being stored. The degree of comparison between the data word and the next successive file word is then compared with the stored comparison signal and if a closer degree of comparison exists the new comparison signal replaces the stored comparison signal. This process continues until the input data word has been compared with all file words with the resulting stored comparison signal representing the greatest degree of comparison between the received data signal and a file word. The address or identity of this file word was also recorded at the time the degree of comparison was recorded so that the system can then access and process the file word producing the greatest degree of comparison. The received data word can then be comparison with the file words in a second group of file words, then a third group, and so on, with that file word of each group of file words which produces the greatest comparison in said each group of file words forming a new group of file words. All of these file words in the new group of file words can then be compared with the data input signal to determine which of these selected file words produces the greatest comparison. This technique will result in the selection of a single file word from all of the groups of file words which will indicate to which group of file words the received data word belongs; i.e. to which group of file words the data most closely compares.

It is apparent that this method for classifying a received data word is relatively slow and requires considerable logic in order to carry out the many individual successive comparisons.

The present invention provides an improved means for classifying an input data word by comparing such a data word simultaneously with all of the file words in many groups of file words and for identifying those file words which exceed a given degree of comparison, and the group in which they are contained. Such selected file words can be limited to only one file word in all of the groups of file words or to more than one file word but only one from any group.

In accordance with a preferred form of the invention there is provided a plurality of groups of comparison means each constructed to simultaneously and individually compare each file word of each group of a plurality of groups of file words with a data word to produce a comparison pulse for each comparison of said data word with a file word. Also provided are means for identifying each group of file words in which the comparison of not more than one file word with the data word produces a comparison pulse whose amplitude exceeds the amplitude of a predetermined threshold, and for identifying each of said one file words.

Before discussing the detailed logic of the invention, a discussion of the general manner in which the data and file words are organized for comparison and the general objects and purposes of such organization will first be set forth in order to better understand the structure of the invention.

It has been found advantageous to organize the incoming data into 8 byte words with each byte representing a characteristic of the subject being classified, whether it be a heart ailment or a moving tank. Similarly, each group of file words representing characteristics of the particular subject classified is comprised of 8 byte words. However, in each such group of file words, there are eight of such 8-byte words so that an incoming 8-byte data word will be compared in each group with eight 8-byte file words.

In the particular embodiment of the invention described herein, there are 128 such groups of eight 8-byte file words for a total of 1024 8-byte file words. All of the comparisons between each received 8-byte data word signal and the 1024 file words are done simultaneously in parallel and then each group of eight 8-byte file words being compared with the 8-byte data input signal is polled to determine the degree of comparison.

Figure 1:
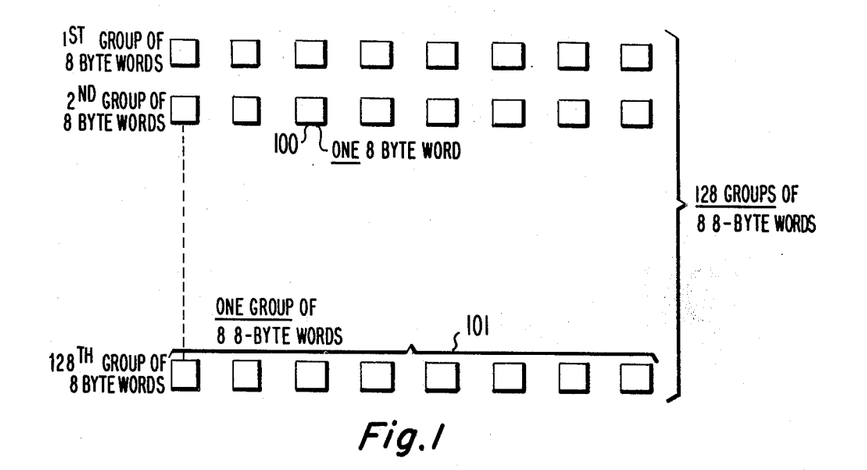
FIG. 1 shows a broad representation of the organization of the file words into groups.

For example, in FIG. 1, each of the squares 100 represent logic which will compare an 8-byte input word with an 8-byte file word. It can be seen that each group of file words consists of eight 8-byte words, as indicated by the group of words 101. Further, it can be seen from FIG. 1 that there are, in fact, 128 groups of such eight 8-byte words for a total of 1024 8-byte file words, each of which will be compared with each received 8-byte data input word. Thus, there are a total of 8192 comparisons of 8-bit bytes, for each 8-byte data input word.

The file words are entered into the 1024 comparison units, of which the single comparison unit 100 of FIG. 1 is one, from a RAM (shown in FIG. 6) and prior to the operation of the system. Thus, the 1024 8-byte file words remain in the 1024 comparators on a more or less permanent basis for any given classification project. However, a different set of file words would be required, for example, for military purposes than would be required for medical purposes.

The system is not limited to 8-bit bytes nor to 8 byte input words and file words. M-bit bytes can be employed where M can be almost any integer such as 4, 8, 12, or 16. In the preferred form of the invention described herein, the number of bytes in a word have been made equal to the number of bits in a byte. In the more general case, the number of bytes in a word can be larger or smaller than the number of bits in a byte. The general expression for a word is "M N-bit bytes", where "M" is the number of bytes in a word and "N" is the number of bits in a byte. M can be made equal to N.

Figure 2:
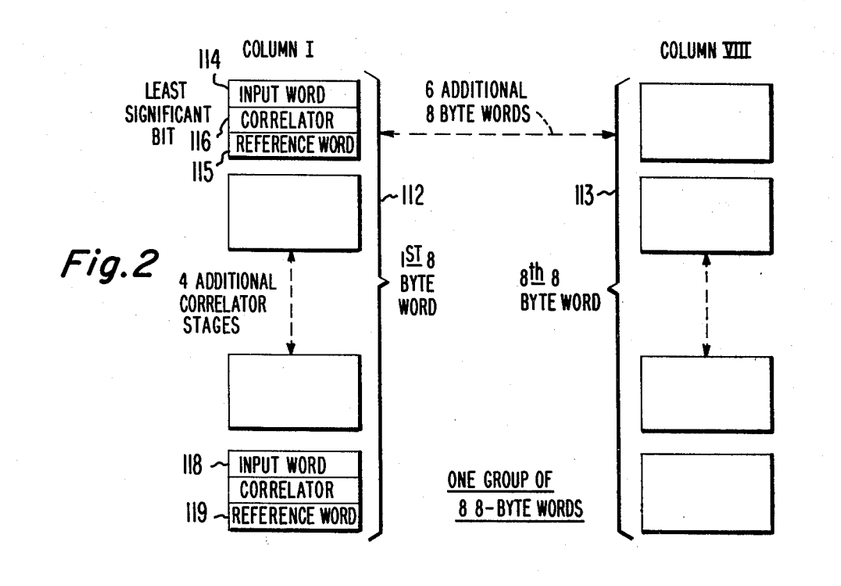
FIG. 2 shows a slightly more detailed representation of the file word organization.

One group of eight 8-byte words is shown in somewhat more detail in FIG. 2, which is the equivalent of the eight 8-byte group words 101 of FIG. 1. The group of blocks 112 in FIG. 2 represent the eight comparisons stages which function to compare one 8-byte file word with the 8-byte data input word. Similarly, the eight comparator stages of column VIII, designated by reference character 113, represent the logic for comparing the eighth 8-byte file word with the same 8-byte data input signal which is being compared in column I. There are six additional columns of comparison stages between column I and column VIII, each of which compares a different 8-byte file word with the same 8-byte data input word.

Figure 3:
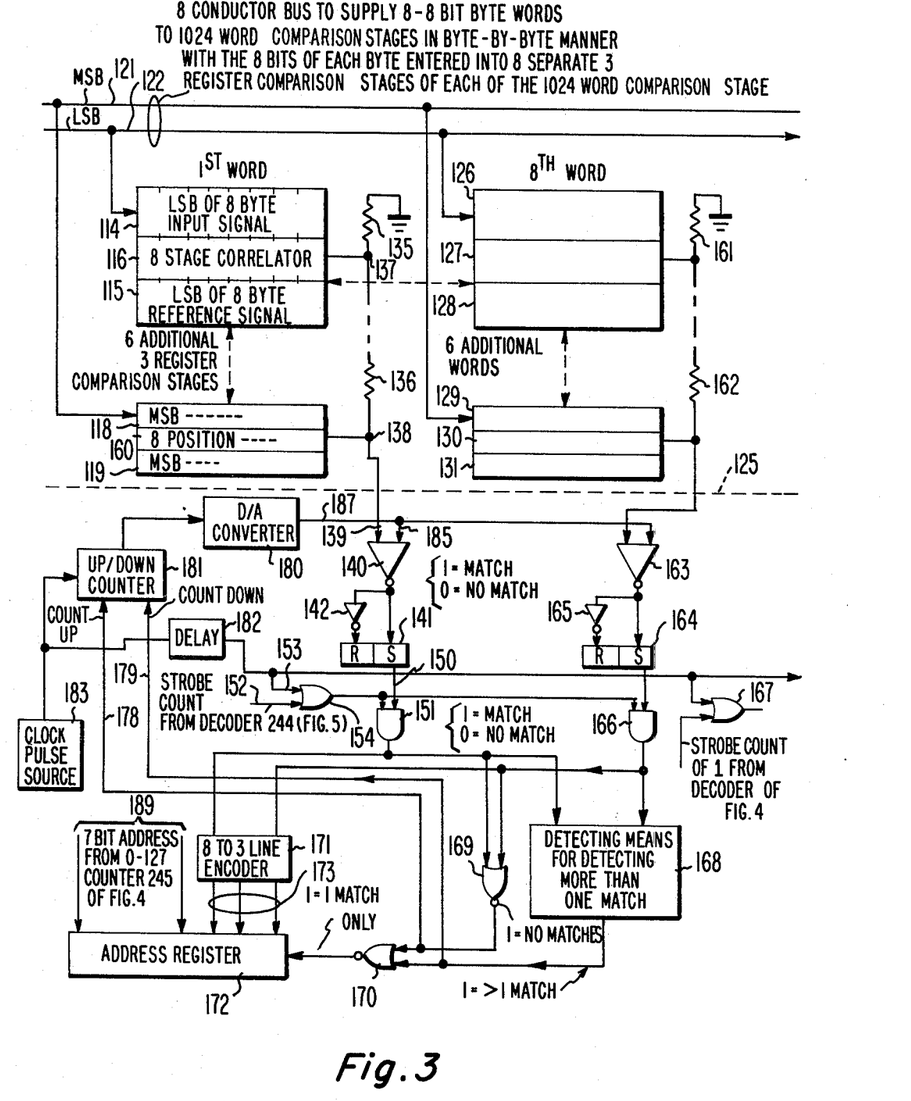
FIG. 3 is a logic diagram showing the basic elements of the invention.

The 8-byte data input word and also each 8-byte file word are stored in the eight comparison stages in each column in the following manner. The least significant bit of each of the 8-bytes of the data input word is stored in the same 8-bit register 114, which is also shown in FIG. 3 and designated by the same reference character 114. Similarly, the least significant bit of the 8 bytes of the file word is stored in the register 115 in of column I of FIG. 2, also shown in FIG. 3. Comparing means is indicated by reference character 116 both in FIG. 2 and in FIG. 3. Comparing means 116 functions to compare the value in each bit position of data input word register 114 with the value of the corresponding bit position of the reference file word register 115. In a similar manner, the most significant bit of each of the 8 bytes of the data input word is stored in register 118 in column I of FIG. 2, which is also shown in FIG. 3. Similarly, the most significant bit of each of the 8 bytes of the reference file word is stored in register 119 in FIG. 2 which is also shown in FIG. 3.

Thus, the most significant bit of each of the 8 bytes of the data input word are compared with the most significant bits of each of the 8 bytes of each of the 1024 8-byte file words and the second most significant bit of each of the 8 bytes of the data input word are compared with the second most significant bits of 1024 8-byte file words, and so on down to the least significant bits of the 8 bytes of the data input word which are individually compared to each of the least significant bits of the 8 bytes of each of the 1024 reference file words.

In FIG. 3 the least significant bit of the input signal of the 8 bytes of the data input word are supplied via bus 122 into all of the 1024 least significant bit word registers, such as registers 114 and 126, of the total array in the manner shown in FIG. 3. The eight most significant bits of the 8 bytes of the data input word are supplied from appropriate memory and control sources via bus 121 into the most significant bit registers of the 8-byte data signal registers, such as registers 118 and 129, of each of the 1024 of the array. Although not shown, the six group of 8 bits ranging from the second to the seventh order are supplied to corresponding registers of the six additional comparison stages of each of the 1024 8-byte words.

The degree of comparison between the 8 bits of any order bit position, such as the most significant bit position of the data input signal, with the 8 most significant bits of any 8-byte file word is defined herein as being inversely proportional to the amount of current measured as a voltage level. More specifically, the greater the comparison the less the current (voltage level) and the less comparison the greater the current (voltage level). Thus, perfect comparison produces no output current. However, in the type classification being discussed, i.e. classifying a data input signal into one of a group of reference file words with which it is most closely related, perfect comparison ordinarily will not occur between any of the reference file words and any data input signal.

To determine which group of file words a given data input word is most closely related the output current or voltage (hereinafter called comparison signal) from comparison of the data input word with each file word of each group is compared to a threshold signal level. This threshold signal level can be varied until only one comparison signal has a magnitude less than that of the threshold signal level. The groups of file words are then polled to determine which group contains the file word producing the said one comparison signal. More specifically, as each 8-byte data word is compared with an 8-byte file word, a comparison signal is generated which is the accumulation of the output signals of the 8 most significant bits of the data input word with the 8 most significant bits of the file word and the comparison of the second 8 most significant bits of the data word with the second 8 significant bits of the file word, and so on. For each group of eight file words being compared with a data input word, there will be produced eight comparison signals, each of a different magnitude depending upon the degree of comparison of the data input word with each of the eight file words. These eight comparison signals are each compared with the common threshold signal in a voltage comparator with the threshold signal being adjusted upwardly or downward until the amplitude of only one of eight comparison signals is less than that of the threshold signal.

The aforementioned discussion illustrates how to determine which file word of a single group of file words produces the best comparison with a data input word. It is desired ultimately, however, to determine which file word of the entire 1024 file words being compared with the data input word produces the best comparison. Thus, the comparison signals resulting from comparison of each of the 1024 file words with the data input word are all compared with the said common threshold voltage, which is then adjusted until it exceeds only one of comparison signals resulting from comparison of the 1024 file words and the data input signal word, and thus identifying that particular file word and group which most closely compares with the data input word. It should be noted that on some occasions, two or more file words, each from different groups of file words, will be selected as most closely comparing with the data input signal word. This simply means that the data input word is about equally related to two or more different groups of file words. The addresses of the selected file words are then stored in suitable memory such as the memory locations of a microprocessor if one is being employed in the system. The file words are subsequently analyzed to determine which groups of file words the data input word belongs and the detailed characteristics of the contents of the data input word.

While each of the 8 bytes of the data input word represents a different characteristic or feature of the subject being classified, there are some characteristics that are more important than others. Consequently, the 8 bytes of the input signal are arranged in an order of importance. Thus the received and stored byte containing the most significant bits of each of the 8 bytes of the data input word will be arranged in an order of importance, as will the received and stored byte containing the next most significant bits of the 8 bytes of the data word, and so on.

Further, it might be desirable to weight the stored byte containing the most significant bits of the 8 bytes of the data word more than the other stored bytes. It might even be desirable to weight both the first and second received and stored bytes more than the remaining six stored bytes. Such weighting can be accomplished by employing, for example, twelve comparison stages for each file word rather than eight comparison stages, with the first three stages and the second three stages being allocated respectively to the first and second stored bytes of the received data signal. It should be noted that all of the file words should be weighted in the same manner. Thus, the number of input signal registers and also file word registers would be increased from M to (X+M) where X=4.

The outputs of each comparison stage, which stage consists of a data input register, a file word register, and a comparison, can be connected to a tap in a series of resistors connected at one end to ground potential and at the other end to one input of a voltage comparator. The common threshold voltage is supplied to the other input of the voltage comparator for that particular logic employed to compare one file word with the data input signal. Each of the other logic means for comparing a file word with the data input word has a corresponding resistive network associated therewith to provide a comparison signal to one input of the associated voltage comparator.

To achieve accuracy of identification of the data input word, no more than one file word per group of file words can be determined to be closely comparable or matched with the data input word. A "match" is defined as that condition when the comparison signal resulting from comparison of the file word with the data input word is less than the common threshold voltage and results in a match output signal from the voltage comparator. If more than one match occurs, logic means is provided to so indicate and then to decrease the amplitude of the threshold signal until only one match exists. More specifically, after the data input word has been stored in the comparison register array, comparison initiating logic is energized whereby all of the 1024 file words are compared (correlated) simultaneously with the data input word. Other logic is provided to determine if there is more than one match in any one of the 128 groups of file words being compared with the data input word. If a signal case of more than one match in a group of file words occurs, than the threshold voltage is lowered until no more than one match condition exists. At that point, the threshold voltage is stablized to maintain the only one match per group condition.

If, upon simultaneous comparison of all the file words with the data input signal word, no matches whatsoever exist, then the logic concludes that the threshold voltage is set too low. The logic will then cause the amplitude of the threshold signal to rise until at least one of the groups of file words contains more than one match. The threshold voltage is then reduced until that more than one match condition disappears, at which time the threshold voltage is stabilized again. By this procedure the logic insures that not more than one match per group exists in the 128 groups of file words being compared with the data input word while at the same time insuring that any one file word in each group that produces a comparison signal less than the threshold voltage will produce a match condition.

Next, appropriate polling means are provided to poll each of the 128 groups of file words to determine if a match exists. As the polling occurs, logic will identify and store the address of each particular one of the 8 file words in each group of file words which produces a match with the input signal. Appropriate logic will then identify those particular file words for analysis after the polling has been completed.

After completion of the polling of the 128 groups of file words and appropriate storage of the addresses of file words producing a match, the array is ready to receive a second data input signal and the cycle will begin anew. Appropriate logic (shown in FIG. 6) is provided to load the new input signal into the array and then, upon completion of the processing of the results of the previous data input word, simultaneous comparison of all file words with the new data input word will occur in the manner discussed above.

The basic principles of operation and purposes of the invention have now been discussed at some length without reference to the logic shown in the figures. A detailed discussion of such logic will now be set forth.

It will be recalled that FIG. 3 shows one group of 8-byte file words being compared with a single 8-byte data input word. The storage registers for the data input signal and the reference file signals, as well as the comparison means, are shown above the dotted line 125 in FIG. 3. Although only two vertical columns and two horizontal rows of comparison stages are shown, there are in fact eight such vertical columns representing the first through the eighth words. Also, there are in fact eight horizontal rows of comparison stages with each row representing 8 bytes of eight different file words each being compared with the same byte of the data input signal.

Also, in each vertical column, as discussed generally above, the least significant bit of each byte of each 8-byte file word is compared with the least significant bit of each byte of the 8-byte data input word; and the most significant bit of each byte of the 8-byte file word is compared with the most significant bit of each byte of an 8-byte data input word. The corresponding orders of bits of the remaining 6 bytes of the given file word are compared with the corresponding orders of bits of the remaining 6 bytes of the data input word.

Thus, for example, in FIG. 3, the eight most significant bits of the data input word are stored in register 118 and are compared with the eight most significant bits of the first file word which are stored in register 119. The eight stage comparison 160 performs the correlating function. Similarly, the eight least significant bits of the first 8-byte file word are stored in register 115 and the eight least significant bits of the 8-byte data word are stored in register 114. Comparison is performed between the least significant bits of the first file word and the data input word in the eight stage comparator 116.

Similarly, for the eighth file word of the first group of eight 8-byte file words, the least significant bits of each of the 8 bytes of the file word are stored in register 128 and the corresponding eight least significant bits of the 8 byte data input word are stored in register 126. Comparison between the corresponding eight bits occurs in eight stage comparator 127. The most significant bits of 8 bytes of the eighth file word are stored in register 131 and the most significant bits of the 8 bytes of the data input word are stored in the register 129. Comparison is effected by the eight stage comparator 130.

Assume that eight 8-byte file words have been entered into their proper registers in FIG. 3 and that the 8 bytes of the data input signal have also been entered into their proper registers in FIG. 3. When properly entered the arrangement of bit order of each of the 8 bytes of the data input word is the same as the bit order of the 8 bytes of each file word. Thus, the eight least significant bits of the data input word in register 114 are arranged in exactly the same order as the eight least significant data bits stored in register 126 and in exactly the same order as the eight least significant bits of each file word. Further, the order of bits ($2^N$), as opposed to bit order (arrangement of bits in a byte), of the eight bytes of each file word is the same as the order of the eight bytes of the input data word. Of course, the file words in each of the eight vertical word positions are different file words.

When comparison begins all of the file words of the 128 groups of file words are compared with each data input signal.

As discussed briefly above, the correlator stages are designed such that the greater the degree of comparison the less the amplitude of the correlation signal produced thereby and supplied to the resistor network, such as the resistor network comprised of resistors 135–136. It will be seen that resistors 135 and 136 are connected between ground 184 and one input 139 of voltage comparator 140. The eight stage comparator 116, which compares the least significant bits of the data input word and the first reference file word is connected to a tap 137 so that the current generated in comparator 116 will flow through resistor 135 to ground and produce a voltage thereacross which will be supplied to one input 139 of voltage comparator 140 through the remaining series resistors of which only resistor 136 is shown.

The current resulting from the non-comparison of the most significant bits of the data input word and the file word are supplied to a tap 138 and will flow to ground through resistor 136, resistor 135, and six other resistors not shown in FIG. 3 which are associated with the six additional comparison stages positioned between the two stages 116 and 160 actually shown in the left hand column of FIG. 3.

Thus, it is apparent that the current produced by the comparison of the most significant bits of data input and file words will produce a higher voltage between the tap 138 and ground than will the output of the comparison 116 which is supplied to tap 137 and which compares the least significant bits of data input and file words. A second voltage, identified hereinbefore as the threshold signal voltage, is supplied from the digital-to-analog (D/A) converter 180 to the second input 185 of difference amplifier 140. When the voltage developed by all of the comparison stages in the first word, for example, in FIG. 3, is less than the voltage supplied to the other input terminal 185 from the D/A converter 180 a "match" is said to occur. Specifically, the definition of a match is that the total output developed across the resistor chain comprised of resistors 135 through 136 and supplied to input terminal 139 of difference amplifier 140 is less than the voltage supplied to the other terminal 185 of comparator 140 from D/A converter 180.

A match condition results in high level logic signal being outputted from difference amplifier 140 and which is supplied to the set input of comparison match indicating flip-flop 141. The output of flip-flop 141 is supplied to a first terminal 150 of AND gate 151. The other input of AND gate 151 is connected to the output of OR gate 154 which will output a strobe pulse at an appropriate time, to be described later, to test whether match indicating flip-flop 141 is set, thereby testing for a match between the first file word and the data input word.

As will be discussed in detail later, the strobe output of OR gate 154 can be produced during the first portion of operation of the system to determine when not more than a single match is produced in any of the 128 groups of file words, or during the second part of the operation when each group, such as the group shown in FIG. 3, is separately and successively strobed to determine which of the groups contain a match. Such logic will be explained in detail in connection with FIGS. 4 and 5. For the purposes of discussion of FIG. 3 it will be assumed that the condition of flip-flop 141 is strobed through OR gate 154 and AND gate 151 by a clock pulse generated in source 183 and supplied through delay means 182 to one input 153 of OR gate 154.

As discussed above, it is desired to generate only a single match from the eight 8-byte group of file words being compared with the input word in the structure of FIG. 3. This means that only one of the eight match indicating flip-flops, of which flip-flops 141 and 164 are actually shown in FIG. 3, can be in a set condition. Thus, the threshold voltage appearing on output lead 187 of D/A converter 180 must automatically be adjusted so that only one of the eight flip-flops, such as flip-flop 141 or 164, becomes set. The level of the threshold voltage on lead 187 is determined by the count of up/down counter 181 which, in turn, is converted to a d.c. voltage by D/A converter 180. The counter 181 is caused to count by the pulses outputted from clock pulse source 183 and will count either up or down in accordance with the polarity of the voltage signals on control leads 179 and 178. The direction of count of counter 181 determines whether the threshold voltage will increase or decrease.

If more than one of the flip-flops, such as flip-flops 141 and 164, are set, then more than one match exists in the group of eight file words being compared with the data input word. Accordingly, the threshold voltage produced at the output of D/A converter 180 must be decreased until the output of either voltage comparator 140 or 163 changes to its low signal level logic so that only one voltage comparator will output a high signal level logic, thereby indicating only one match.

On the other hand, if the outputs of all of the voltage comparators, such as voltage comparators 140 and 163, are low level signals, then all of the flip-flops, such as flip-flops 141 and 164, will be reset by means of inverters, such as inverters 142 and 165, indicating a condition of no matches between the eight file words and the data input word.

Therefore, logic must be provided to indicate the condition of more than one match and a condition of no matches at all. When neither of such conditions exists then it necessarily follows that a condition of only one match exists, which is the desired condition.

A means for detecting more than one match is contained within the block 168. Each of the outputs of the eight AND gates, such as AND gates 151 and 166 are supplied to the detector 168 which responds thereto to determine if more than one match exists. Such logic can be simply a current summer which detects when current from more than one of the AND gates 151 or 166 is being supplied thereto.

When no matches exist, the output of NOR gate 169, all inputs of which are connected to the outputs of AND gates such as AND gates 151 and 166, will be high level signals indicating no matches.

The outputs of both the more-than-one match detecting means 168 and the no match indicating NOR gate 169 are supplied to another NOR gate 170. If either input from NOR gate 169 or more-than-one match detecting means 168 to NOR gate 170 is a high level signal then the output of NOR gate 170 will be a low level signal indicating that the condition of only one match does not exist. The condition is either no matches or more-than-one match. However, if the output from NOR gates 169 and 168 are both low level signals, then neither the condition of no matches or more-than-one match exists and therefore the condition of one match only must exist. The output of NOR gate 170 will then be a high level signal which will enable address register 172 to store the address of the file word causing the match condition in a manner to be described later herein.

Returning again to the generation of the proper threshold voltage to generate only one match, the output of means 168 for detecting more-than-one match is supplied to input 179 of up/down counter 181 and if more-than-one match is indicated by detecting means 168 the counter 181 will count downwardly. Counter 181 will count downwardly to reduce the threshold voltage outputted from D/A converter 180 until only one match exists or until the output of detecting means 168 is at a low signal level indicating that not more than one match exists, i.e., either only one match or no matches exists, but not more than one match.

The output of NOR gate 169 is supplied to the other input 178 of up/down counter 181 and, if no matches appear in the comparison of the eight 8-byte file words with the data input word, then the output of OR gate 169 will be at a high logic level and the up/down counter 181 will count upwardly until one match occurs.

As discussed above, the outputs of both the means 168 for detecting more than one match and the NOR gate 169 are supplied to NOR gate 170. If the outputs of both means 168 and NOR gate 169 are both low level signals, the state of comparison is neither more than one match nor is it no matches. Therefore, it must be one match so the output of NOR gate 170 is a high level signal indicating only one match. The output of NOR gate 170 enables address register 172, as discussed above, to record the address of the file word causing such single match.

The recording of the address of the file word causing such single match is accomplished by an 8-to-3 line encoder 171 which responds to the outputs of the eight AND gates, such as AND gates 151 and 166 and identifies the particular AND gate which has a high level output indicating a match condition. The three output leads 172 of encoder 171 indicate in binary form the address of the above-mentioned particular AND gate and supply such address to address register 172 where it is stored.

The seven bit word on the seven leads 189 from counter 245 (FIG. 5) define which of the 128 groups of file words is supplying a single match condition in a manner and by logic shown in FIG. 5, which will be described later herein. FIG. 3 shows only one such group. Thus the encoded signals on the seven leads 189 coupled with the encoded signals on the three output leads 172 from encoder 171 will identify any one of the 1024 file words contained in the 128 groups of file words.

Figure 4:
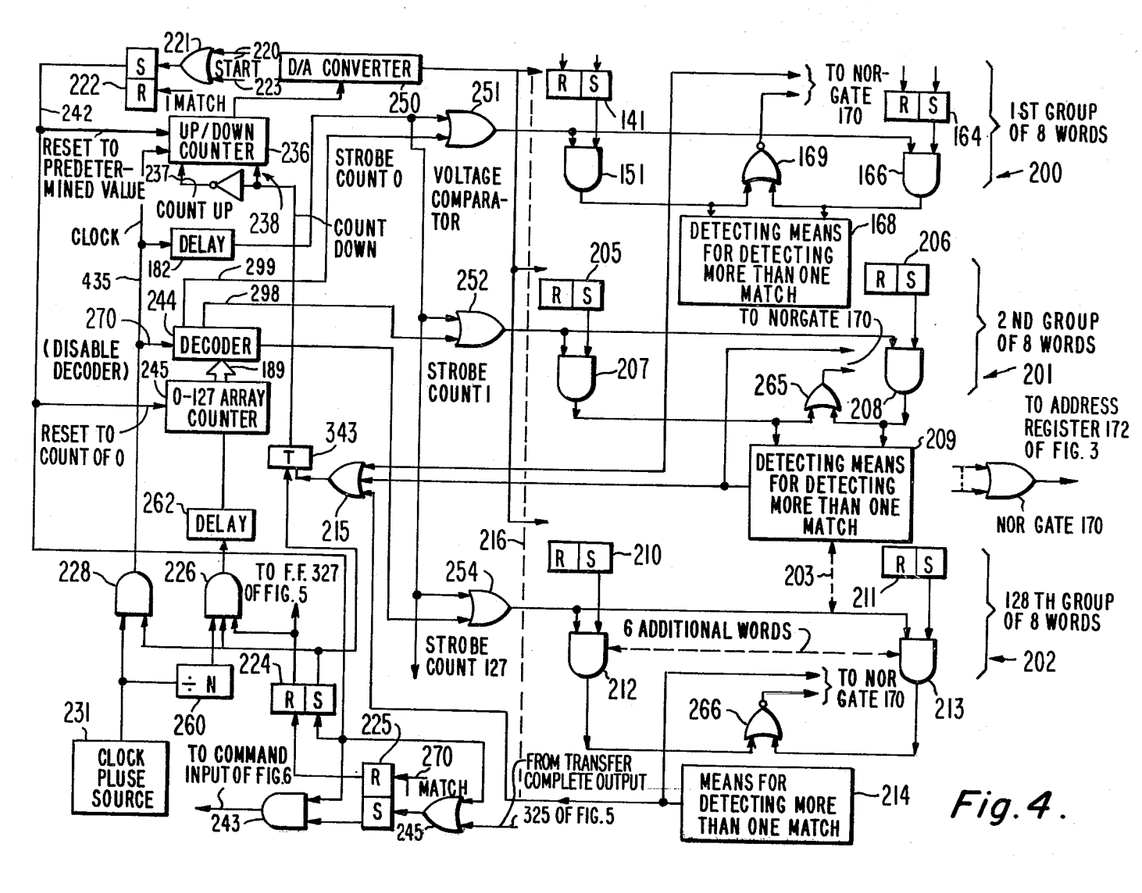
FIG. 4 is a logic diagram of the system emphasizing the logic employed to establish the threshold voltage.

Referring now to FIG. 4, there is shown a more complete logic diagram of the entire structure including the control circuitry for initially adjusting the threshold voltage to obtain a single match as a result of comparison of all 128 groups of file words with the data input word and also the control circuitry for strobing the 128 groups after the single match condition has been acquired.

In FIG. 4, the comparison stages are shown in skeleton form to the right of the vertical dotted line 216. More specifically, only the match indicating flip-flops, the following AND gates, and the detecting means for detecting more than one match are shown for each group of the 128 groups of eight 8-byte words. For example, at the upper right hand corner of FIG. 4, there are shown match indicating flip-flops 141 and 164, AND gates 151 and 166, and detector means 168 for detecting more than one match, of all which correspond to the flip-flops 141 and 164, the AND gates 151 and 166 and the detector 168 of FIG. 3 for comparison of the first group of eight file words with the data input word.

The logic for comparing the second group of eight file words with the data input word is indicated in the same skeleton manner within the bracket 201 which shows only match detecting flip-flops 205 and 206, the AND gates 207 and 208, and means 209 for detecting more than one match.

Also shown in skeleton form within bracket 202 is the logic for comparing a data word with the last or 128th group of eight file words. The 128th group of words includes only match indicating flip-flops 210 and 211, AND gates 212 and 213 and detecting means 214 for detecting more than one match. The logic for comparing the remaining 125 groups of eight file words with the data input word is not specifically shown in FIG. 3, but is indicated generally by the short dotted line 203.

To the left of the dotted line 216 is shown the threshold voltage setting control circuitry which will now be described. First, consider that portion of the operation in which the threshold voltage is automatically set so that only one match exists in any of the 128 groups of eight words. Specifically, a start signal is supplied to input lead 220 of OR gate 221 (FIG. 4) which sets flip-flops 222 located at the upper left hand corner of FIG. 4. The set condition of flip-flop 222 functions to set flip-flop 224 directly through lead 242 and flip-flop 225 through OR gate 245, to inhibit the output of AND gate 243 for purposes which will be explained later.

Flip-flop 224, when set, inhibits AND gate 226 but primes AND gate 228 so that pulses from clock pulse source 231 will pass through AND gate 228 and lead 435 to clock input 235 of up/down counter 236. The initial count of up/down counter 236 is present at the beginning of each new comparison (the entry of a new data word to be compared) to a predetermined value which can be below the expected single match condition or which can be above any expected single match condition for reasons which will be described later herein. In any event, the up/down counter 236 will count either up or down depending upon whether a high logic signal is supplied to count up lead 237 or to count down lead 238.

It should be noted that up/down counter 236 corresponds to up/down counter 181 of FIG. 3. However, the arrangement of FIG. 3 is a simplified form of the invention wherein there is no provision for presetting the count of up/down counter 181 above the count required to produce a threshold voltage greater than the expected final threshold value. The advantage of presetting the count of the up/down counter 236 to such a high value is that it can then be caused to count downwardly until all more-than-one match conditions are eliminated, leaving, however, all of the possible single-matched conditions. As will be discussed below, the up/down counter 236 of FIG. 4 can be preset to such a high value. Alternatively, the up/down counter 236 of FIG. 4 can be set to a value below that count which will produce a threshold voltage of an amplitude that will detect only a single match from all 128 groups of file words collectively.

Further, there is no logic shown in FIG. 3 to poll the 128 groups of file words to determine which group, or groups, of file words contain a single match. FIG. 4 contains such logic and will, in fact, after the existence of only single matches has been established, poll all 128 groups of file words to determine which groups contain a single match. Because of the foregoing differences in logic between FIGS. 3 and 4, the inputs to the up/down counter 181 of FIG. 3 and the up/down counter 236 of FIG. 4 are different. The detailed reasons for such differences will become apparent from the discussion of FIG. 4.

In FIG. 4, the counting up or counting down of counter 236 is determined primarily by the output from OR gate 215 which produces a high level logic signal if there is more than one match in any one of the 128 groups of comparison and a low level logic signal if the number of matches is not greater than one in any given groups.

Thus, for example, if the number of matches in a given group of eight file words being compared with the data word exceeds one, the high level output from OR gate 215 will be supplied to counter 236 through transmission gate 343 which has been primed by the set condition of flip-flop 224, which condition exists only during the time that a single match condition is being established.

The high level output of transmission gate 343 is supplied to the count down terminal 238 of counter 236, thereby lowering the count therein. Such count is supplied to digital-to-analog (D/A) converter 250. When the count in counter 236 decreases sufficiently, the output of D/A converter 250, which is the threshold voltage of the system, will decrease to a point where existing matches will become non-matches until there is no more than one match in any single group of file words being compared.

The single match condition, in each group where it exists, is outputted as a high level signal through an OR gate such as OR gate 169 of FIG. 3 (not shown in FIG. 4) to the reset input terminal 270 of flip-flop 225. Flip-flop 225 (FIG. 4) is reset immediately upon the output of OR gate 215 of FIG. 4 changing from a high level to a low level signal since that is the time that only single matches become existent in the system. The resetting of flip-flop 225, in turn, functions to reset flip-flop 224, thereby priming AND gate 226 through lead 227 and disabling AND gate 228 through lead 230. Disabling of AND gate 228 enables decoder 244 via lead 270 to allow successive strobings of each of the 128 groups of file words in a manner to be discussed below. In general, decoder 224 and 128 output leads, one for each of the 128 counts (0 to 127) of binary counter 245. For purposes of discussion, the 128 output signals on the 128 output leads of decoder 244 will be designated as being strobe counts 0 through 127, corresponding to the actual counts of counter 245. Decoder 244 is disabled by the output of AND gate 228 during the time the system is establishing a single match but will be ready to output a strobe count of 0 (actually a binary 1 on its output terminal 299) when AND gate 228 is disabled, since counter 245 has been reset to 0 count. AND gate 228 is disabled and AND gate 226 is enabled when a single match is established.

The operation of the system has now progressed to the point where a threshold voltage has been found which will produce only a single match in any given group and the clock pulses supplied from source 231 to up/down counter 236 have been blocked by the disabling of AND gate 228. Thus, the threshold voltage at the output of D/A converter 250 will remain the same and the system is now prepared to determine in which groups of the 128 groups of eight file words a single match exists. Such determination is made by the logic including binary counter 245, decoder 244, and strobe OR gates such as strobe OR gates 251, 252, and 254. There are, in fact, 128 such strobe OR gates, one for each of the 128 groups of eight file words being correlated with the data input word.

The output of clock pulse source 231 is divided down by divide-by-N circuit 260 for strobing purposes. The clock pulses from source 231 can then be traced from said source 231 through divider 260, primed AND gate 266, and delay means 262 to the input of binary counter 245.

At the time of the reception of the first clock pulse from source 231 after the resetting of flip-flop 224 and the enablement of AND gate 226, the counter 245 contains a count of 0 to which it was reset when flip-flop 222 was set at the beginning of operation as described above. The output of decoder 244 is also a 0 at this time which means there is a binary 1 on output lead 229 thereof. Therefore, the strobing of the first group of eight words through strobe OR gate 251 will occur immediately after the resetting of flip-flop 224. The delay 262 is inserted in the output of AND gate 226 to delay the changing of the count of counter 245 and thereby the state of the output count of decoder 244 from a 0 to a 1 until the strobing of the first group of eight file words 200 is completed.

The first pulse to pass through AND gate 226 and delay means 262 will then change the count of counter 245 from a 0 to a 1 so that the next strobing pulse will be supplied from decoder 244 through strobe OR gate 252 via lead 298 to determine if the second group of eight file words contain a match, as determined by logic including the means for detecting more-than-one match, such as means 209 and means for detecting a no match condition such as is shown in FIG. 3. It is to be understood, however, that each group of file words of the 128 groups represented in FIG. 4 contains a NOR gate corresponding to the NOR gate 169 of FIG. 3 and receives as its input signals the outputs from all of the AND gates in such group, such as AND gates 151 and 166, of the first group of eight words 200 in FIG. 4.

All of the outputs of the detecting means of FIG. 4 such as detecting means 168, 209, and 214 and associated NOR gates such as NOR gates 169, 265, and 266 are supplied to a common NOR gate 170, shown at the right of FIG. 4, which corresponds to NOR gate 170 shown at the bottom of FIG. 3. The output of NOR gate 170 is supplied to an address register 172 as shown in FIG. 3.

Each time one of the strobed groups of the 128 groups of file words indicates the presence of the single match, the NOR gate 170 outputs a high level logic signal which enables address register 172 (FIG. 3) to store the address supplied thereto from the 8-to-3 line encoder 171 of FIG. 3 and the 7 bit address from counter 245 of FIG. 4. The seven output connections from binary counter 245 of FIG. 4 to address register 172 of FIG. 3 are shown collectively in FIG. 4 as output leads 189 which also go to decoder 244 of FIG. 4.

Figure 5:
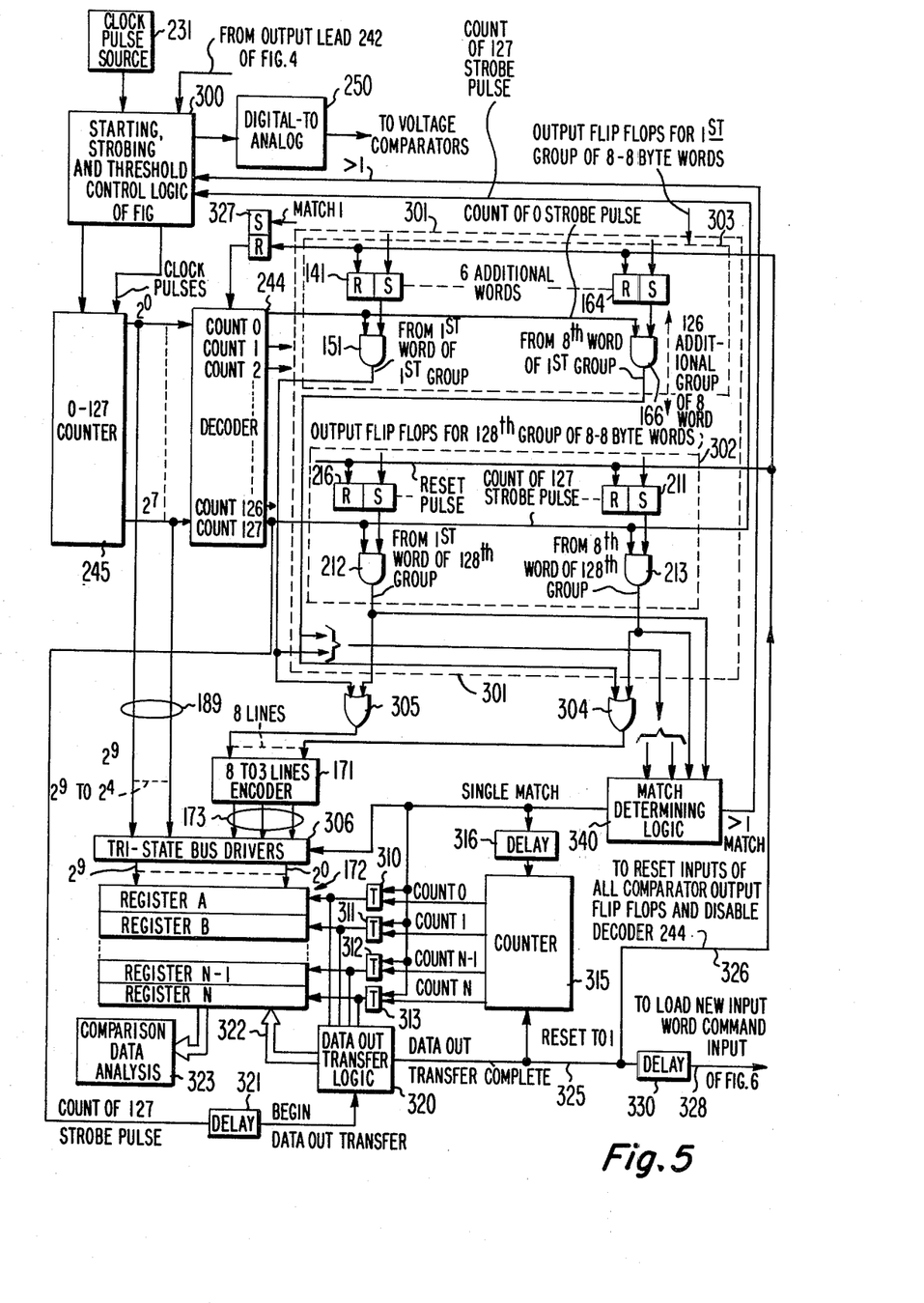
FIG. 5 is a logic diagram of the system emphasizing the logic employed to identify and store the file words in each group producing match comparison.

Referring now to FIG. 5 there is shown another combination block and logic diagram of the complete system with emphasis on different aspects thereof. More specifically, the detailed logic of FIG. 4 for establishing the threshold voltage is represented generally by the block 300 in FIG. 5. The 1028 groups of three-register comparison means for comparing the 1028 file words with the data input word are shown generally within the dotted block 301 in a skeleton manner, somewhat as shown in FIG. 4. For example, the match indicating flip-flops 141 and 164 and associated AND gates 151 and 166 of the comparison logic of the first group of eight 8-byte file words are shown within dotted block 303 which, in turn, is within dotted block 301.

Thus, in summary, the logic of FIG. 5 initially sets the threshold reference signal to the correct value by means of clock pulse source 231, up/down counter 236, and D/A converter 250 so that no group of file words has more than one match. Then, the 128 groups are polled by means of clock pulse source 231, counter 245 and decoder 244 to determine which groups have a match. Next, by means of encoder 171 and counter 245 the address of each file word, by group and word, containing a single match, is entered into the address register 172.

Shown within dotted block 302 are match indicating flip-flops 216 and 211 and associated AND gates 212 and 213 of the comparison logic of the 128th group of eight 8-byte file words.

It is to be understood that the logic within the block 301 is intended to include all of the logic shown in FIG. 3. In addition, FIG. 5 shows in more detail the logic required to identify the address of a single match and to enter such address into the address register 172 which consists of a plurality of registers A through N.

Assume for example, that a match exists in the first group of file words contained in dotted block 303. At the count of 1 of decoder 244, (FIG. 5), one of the eight AND gates 151 through 166 will output a high level logic signal indicating a single match condition. This high level signal will pass through OR gate 305 and into the 8-to-3 line decoder 171 which will identify the particular AND gate (AND gate 151) of AND gates 151 through 166 which is outputting a high level signal and thereby determine which one of the eight 8-byte file words has established a comparison match with the data input signal.

It is also necessary to determine that the signal match is occurring in the first group of the 128 groups of file words. The identification of the first group is established by the signal levels of the seven output terminals of the 0-to-127 binary counter 245, which are also supplied to the tri-state bus drivers 306. Since the single match is occurring in the first group of file words, the contents of the least significant bit position of the binary counter 245 will be a binary 1 and all the contents of the remaining six bit positions will be binary 0's.

Simultaneously, the output of the match determining logic 340 will enable the bus drivers 306 to enter the address appearing on input leads 189 and 173, supplied thereto from binary counter 245 and encoder 171, into register A under control of TRANSMISSION gate 310. It will be assumed that counter 315 was reset to zero during the initialization stage of the operation so that TRANSMISSION gate 310 is primed to pass the high level logic signal from the single match determining logic 340 through TRANSMISSION gate 310 to point to register A as the storage register for the address of the first single match. Shortly after the address of the first single match is stored in register A, the counter 315 will advance from the count of 0 to the count of 1 by the pulse from match determining logic 340 being supplied through delay means 316.

Thus, if a second single match occurs, as for example when the 75th group of eight 8-byte file words is strobed, the address of the particular file word in the 75th group of file words causing the single match will be stored in register B. Any subsequent single matches occurring in subsequent groups of file words will be stored in successive registers of storage means 172.

When the strobing is completed and the output count of decoder 244 is 128, the data out transfer logic 320 will be energized by said count of 128 through delay means 321. The data out transfer logic 320 will then function to transfer the data via bus 322 from storage means 172 into comparison data analysis logic means 323. The comparison data analysis logic 323 will then extract the actual file words represented by the addresses transferred thereto from storage means 172 and analyze such file words for their significance.

After the data out transfer logic 310 has transferred all of the addresses from storage means 172 into the comparison data analysis logic 323, the process is completed and the system is ready to compare the 1028 file words with another data input word. Accordingly, a high level logic signal is supplied from data out transfer logic 320 onto the output lead 325 and then onto two paths to perform the following functions. The first path is via lead 326 wherein the high level signal functions to reset all of the match detecting flip-flops such as flip-flops 141 and 164 and also to disable the decoder 244 by resetting flip-flop 327. Disabling of decoder 244 stops the strobing process. The other path from the output of data transfer logic 320 is through delay means 330 and lead 328 to the Load New Input Word Command Input 328 of FIG. 6.

Figure 6:
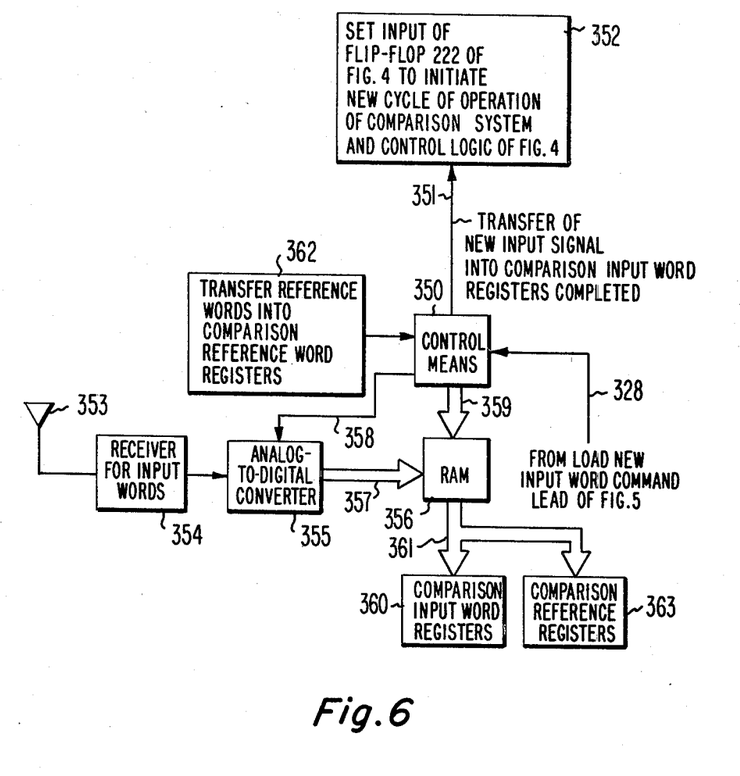
FIG. 6 shows a broad block diagram of the system.

In FIG. 6 the control means 350 responds to the Load New Input Word Command to load a new data input word from RAM 356 via buses 359 and 361 into the data input word registers of the comparators such as, for example, the registers 114, and 118, 126, and 129 of FIG. 3 and represented collectively by block 360 of FIG. 6. The control means 350 then outputs a signal on lead 351 indicating that the transfer of the new data input word into the data input word registers has been completed. Such signal on lead 351 functions to set flip-flop 222 of FIG. 4 to initiate a new cycle of operation of the entire system and its associated control logic shown in FIG. 4. This last-mentioned function is indicated in block 352 of FIG. 6.

The received data input words can be digitized and stored while awaiting comparison in different ways. One such way is shown in FIG. 6 wherein the received signal, which is assumed to be an analog signal, is received via antenna 353 and then supplied to receiver 354 where the usual processing of a received signal occurs. The processed signal is then supplied to an analog-to-digital converter 335 with the digitized output being stored in RAM 356 as input data words via bus 357 and under control of control means 350 via lead 358.

The reference file words were originally entered into the reference file word registers, represented generally by block 363, as a result of a command generated by logic within block 362 which supplied a signal to control means 350 indicating that the reference file words are to be entered into the comparator reference file word registers. The control means 350 responds to such signal to access RAM 356, which also could be a ROM, and supplies such file words to the reference file word registers designated generally by block 363.

The setting of flip-flop 222 (FIG. 4) initiates a new cycle of operation with the new data input word in the same manner as discussed in detail above.

While 128 groups of eight 8-byte file words and specific logic means are employed to perform various specific functions, it is apparent that file words of different dimensions and other logic means can be employed without departing from the scope or spirit of the invention.

What is claimed is:

1. A system for classifying digitized data words into one or more of several categories each defined by a group of digitized file words and comprising:
   a plurality of groups of comparison means with each group constructed to compare each received data word with each file word in a different one of said groups of file words to produce comparison pulses in response to each comparison of said received data word with a file word;
   means for generating a variable threshold signal;
   means for comparing each comparison pulse with said threshold signal;
   means responsive to said threshold signal and each of said comparison pulses individually to change the amplitude of said threshold signal to a value at which not more than one comparison pulse from each group of comparison means will exceed the amplitude of the threshold signal in a given polarity direction to produce a comparison match; and
   means for polling each group of comparison means to identify each file word producing a comparison match.

2. A system as in claim 1 in which each group of comparison means comprises a plurality of sub-groups of comparison logic each comprising:
   first register means for storing said data word;
   second register means for storing a file word; and
   comparing means responsive to said stored data word and said stored file word to generate a comparison pulse indicating the degree of comparison therebetween.

3. A system as in claim 1 in which each data word and each file word is comprised of M N-bytes and in which each group of comparison means comprises a plurality of sub-groups of comparison logic each comprising:
   (X+M) N bit position data word registers, where X=0 or an integer, for storing the received data word with each of N bits of the same order of the N bytes thereof being stored in the same register in a given sequence;
   (X+M) N bit position file word registers for storing a file word with each group of N bits of the same order of the N bytes being stored in the same register in said given sequence; and
   comparison means for comparing the contents of the data word registers storing the bits of a given order of the data word with the contents of the registers storing the bits of the corresponding given order of the file word to produce said comparison pulses.

4. A system for determining with which of a plurality of groups of file words a data word most closely compares and comprising:
   a plurality of groups of comparison means each constructed to simultaneously compare each file word of each group of file words with said data word to produce a comparison indicating signal for each comparison of said data word with a file word;
   means for identifying each group of file words in which the comparison of not more than one file word with the data word produces a comparison indicating signal whose amplitude exceeds, in a given polarity direction, a particular threshold level, and for identifying each of said one file words; and
   means responsive to the comparison indicating signals from each group of file words to establish such particular threshold level.

5. A system as in claim 4 in which each group of comparison means comprises a plurality of sub-groups of comparison logic each comprising:
first register means for storing said data word;
second register means for storing a file word; and
comparing means responsive to said stored data word and said stored file word to generate one of said comparison indicating signals.

6. A system as in claim 4 in which each data word and each file word is comprised of M N-bytes and in which each group of comparison means comprises a plurality of sub-groups of comparison logic each comprising:
(X+M) N bit position data word registers, where X=0 or an integer, for storing the received data word with each of N bits of the same order of the N bytes thereof being stored in the same register in a given sequence;
(X+M) N bit position file word registers for storing a file word with each group of N bits of the same order of the N bytes being stored in the same register in said given sequence; and
comparator means for comparing the contents of the data word registers storing the bits of given orders of the data word with the contents of the registers storing the bits of corresponding given orders of the file word to produce said comparison indicating signals.

7. A system for determining with which of a plurality of groups of file words a data word most closely compares and comprising:
a plurality of groups of comparison means each constructed to simultaneously compare each file word of each group of file words with said data word to produce a comparison indicating signal for each comparison of said data word with a file word;
means for identifying each group of file words in which the comparison of not more than one file word with the data word produces a comparison indicating signal whose amplitude exceeds, in a given polarity direction, a predetermined threshold level, and for identifying each of said one file words.

8. A system as in claim 7 in which each group of comparison means comprises a plurality of sub-groups of comparison logic each comprising:
first register means for storing said data word;
second register means for storing a file word; and
comparing means responsive to said stored data word and said stored file word to generate one of said comparison indicating signals.

9. A system as in claim 7 in which each data word and each file word is comprised of M N-byte words and in which each group of comparison means comprises a plurality of sub-groups of correlation logic each comprising:
(X+M) N bit position data word registers, where X=0 or an integer, for storing the received data word with each of N bits of the same order of the N bytes thereof being stored in the same register in a given sequence;
(X+M) N bit position file word registers for storing a file word with each group of N bits of the same order of the N bytes being stored in the same register in said given sequence; and
comparator means for comparing the contents of the data word register storing the bits of given orders of the data word with the contents of the registers storing the bits of corresponding given orders of the file word to produce said comparison indicating signals.

10. A method for determining which of a plurality of groups of file words a data word most closely compares and comprising the steps of:
simultaneously comparing each file word with the data word to produce a comparison pulse for each comparison:
simultaneously comparing each comparison pulse with a variable threshold signal;
adjusting said variable signal until not more than one comparison resulting from the comparison of each separate group of file words with the data word exceeds the variable threshold signal in a given polarity direction; and
polling the comparison pulses of each group of file words to identify which of said file words produce one of said one comparison pulses.

11. A method for determining which of a plurality of groups of file words a data word most closely compares and comprising the steps of:
simultaneously comparing each file word with the data word to produce a comparison pulse for each comparison;
simultaneously comparing each comparison pulse with a variable threshold signal;
adjusting said variable threshold signal until not more than one comparison pulse resulting from the comparison of each separate group of file words with the data word exceeds the variable threshold signal in a given polarity direction; and
polling the comparison pulses of each group of file words to identify which of said groups produce one of said one comparison pulses.

* * * * *

UNITED STATES PATENT AND TRADEMARK OFFICE
CERTIFICATE OF CORRECTION

PATENT NO. : 4,316,177
DATED : February 16, 1982
INVENTOR(S) : Daniel Hampel et al.

It is certified that error appears in the above-identified patent and that said Letters Patent is hereby corrected as shown below:

Column 2, line 1, "comparison" should be ---compared---;

Column 7, line 21, "comparison" should be ---correlator---;

Column 7, lines 21 & 22, "correlating" should be ---comparing---;

Column 8, line 16, "comparison" should be ---non-comparison---;

Column 12, line 41, "224" should be ---244---;

Column 13, line 13, "229" should be ---299---;

Column 18, line 2, "correlation" should be ---comparison---;

Column 18, line 29, after the first "comparison" insert ---pulse---.

Signed and Sealed this

Fifteenth Day of June 1982

[SEAL]

Attest:

GERALD J. MOSSINGHOFF

Attesting Officer   Commissioner of Patents and Trademarks